United States Patent
Takamatsu (10) Patent No.: US 6,254,238 B1
(45) Date of Patent: Jul. 3, 2001

(54) COOLING SYSTEM FOR A VIDEO PROJECTOR

(75) Inventor: Hiroaki Takamatsu, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/327,024

(22) Filed: Jun. 7, 1999

(30) Foreign Application Priority Data

Jun. 10, 1998 (JP) .................................. 10-161708

(51) Int. Cl.⁷ .................................................. G03B 21/16
(52) U.S. Cl. .............................................................. 353/61
(58) Field of Search .............................. 353/52, 57, 58, 353/60, 61, 119; 165/122, 126

(56) References Cited

U.S. PATENT DOCUMENTS

| | | | |
|---|---|---|---|
| 3,902,799 | * 9/1975 | Winkler et al. | 353/61 |
| 5,076,543 | * 12/1991 | Mandai | 353/61 |
| 5,609,404 | * 3/1997 | Keelan et al. | 353/60 |
| 5,951,136 | * 9/1999 | Furuhata et al. | 353/61 |
| 6,007,205 | * 12/1999 | Fujimori | 353/57 |
| 6,033,077 | * 3/2000 | Iwase | 353/61 |

FOREIGN PATENT DOCUMENTS

| | | |
|---|---|---|
| 4-191726 | 7/1992 | (JP) . |
| 4-271334 | 9/1992 | (JP) . |
| 6-13776 | 1/1994 | (JP) . |
| 6-95251 | 4/1994 | (JP) . |
| 7-312495 | 11/1995 | (JP) . |
| 9-133911 | 5/1997 | (JP) . |
| 9-319007 | 12/1997 | (JP) . |

* cited by examiner

Primary Examiner—William Dowling
(74) Attorney, Agent, or Firm—Ostrolenk, Faber, Gerb & Soffen, LLP

(57) ABSTRACT

A cooling system for a video projector having a high degree of cooling efficiency and preventing an operator from being exposed to hot exhaust air. The system having a case; an intake formed on the case; an outlet formed on the case; a radial fan having an intake side and an exhaust side communicated with the outlet, for blowing air in a direction orthogonal to a rotary shaft thereof; and a cooling duct having an opening opened to a component to be cooled therearound located in the case, and another opening communicated with the intake side of the radial fan. The radial fan induces a negative pressure in the case so as to take a cooling air from outside into inside of the case and to lead the cooling air so as to pass around the component to be cooled before it is directly led into the radial fan through the cooling duct in order to discharge the cooling air outside of the case.

20 Claims, 7 Drawing Sheets

COOLING SYSTEM FOR A VIDEO PROJECTOR

FIELD OF THE INVENTION

1. Background of the Invention

The present invention relates to a cooling system for a video projector.

2. Description of Related Art

Heretofore, a video projector for projecting and displaying a video signal delivered from the outside in the form of a video image, as the video image onto a projection screen has been well-known. In this video projector, there is generally used, as an optical source, a projecting lamp having high light intensity, for projecting the video image in the form of an optical image onto the projection screen. Accordingly, there is incorporated a cooling system for cooling the projecting lamp and, as well, an optical system.

As to the cooling system, there has been generally used a forced type air-cooling system in which cooling air streams are induced through the video projector by using of a cooling fan so as to dissipate heat accumulated in the projection lamp and the optical system within the video projector.

Figure 5:
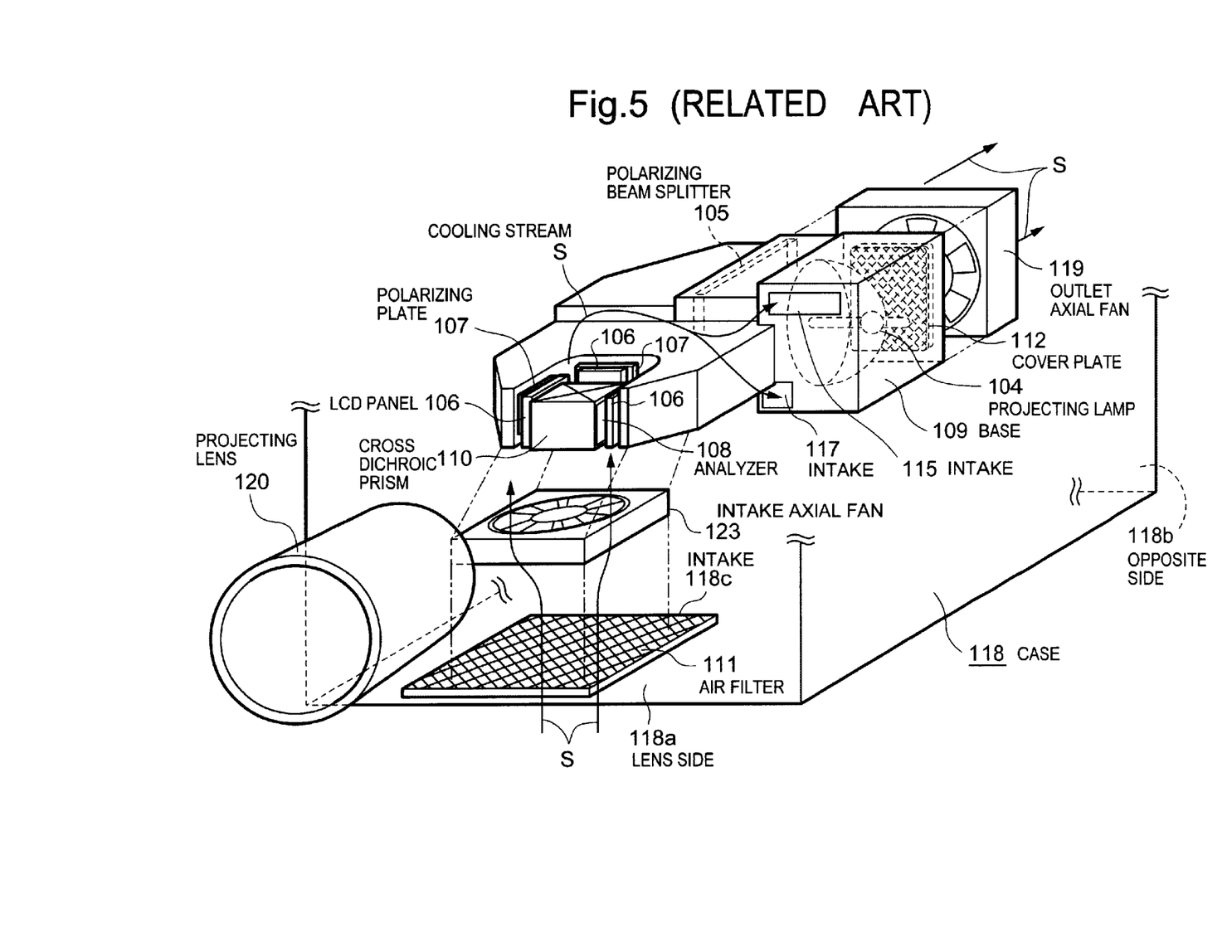
FIG. 5 is a partial-broken perspective view showing a cooling system for a video projector according to a first related art.

FIG. 5 is a partial-broken perspective view showing a cooling system for a video projector according to a first related art. The video projector is composed of a projecting lamp 104, a polarizing beam splitter 105, LCD panels 106, polarizing plates 107, analizers 108, a base 109, a cross dichroic prism 110, an air filter 111, a cover plate 112, intakes 115, 117, a case 118, an outlet axial fan 119, a projecting lens 120 and an intake axial fan 123.

In this arrangement, when the intake axial fan 123 and the outlet axial fan 119 are rotated, a cooling stream S is introduced into the case 118 from the outside of the case 118 through the air filter 111. The cooling air stream S being led through the intake axial fan 123 and then blown through a space between the LCD panels 106 and the cross dichroic prism 110 so as to cool the LCD panels 106 and the cross dichroic prism 110. The air stream S having passed through the space between the LCD panels 106 and the cross dichroic prism 110 is circulated through the interior of the case 118. Then, the air stream S is sucked into the intakes 115, 117 by means of the outlet axial fan 119 so as to cool the projecting lamp 104. Then, the cooling stream S is led through the cover plate 112. Finally, the cooling stream S is discharged outside of the case 118 through the outlet axial fan 119.

Further, Japanese Laid-Open Patent Publication No. Hei 4-271334 (published on Sep. 28, 1992 in Japan) discloses a cooling structure for a liquid crystal projector having two cooling fans for cooling components to be cooled in a case of the projector. The technology will be described as a second related art.

Figure 6:
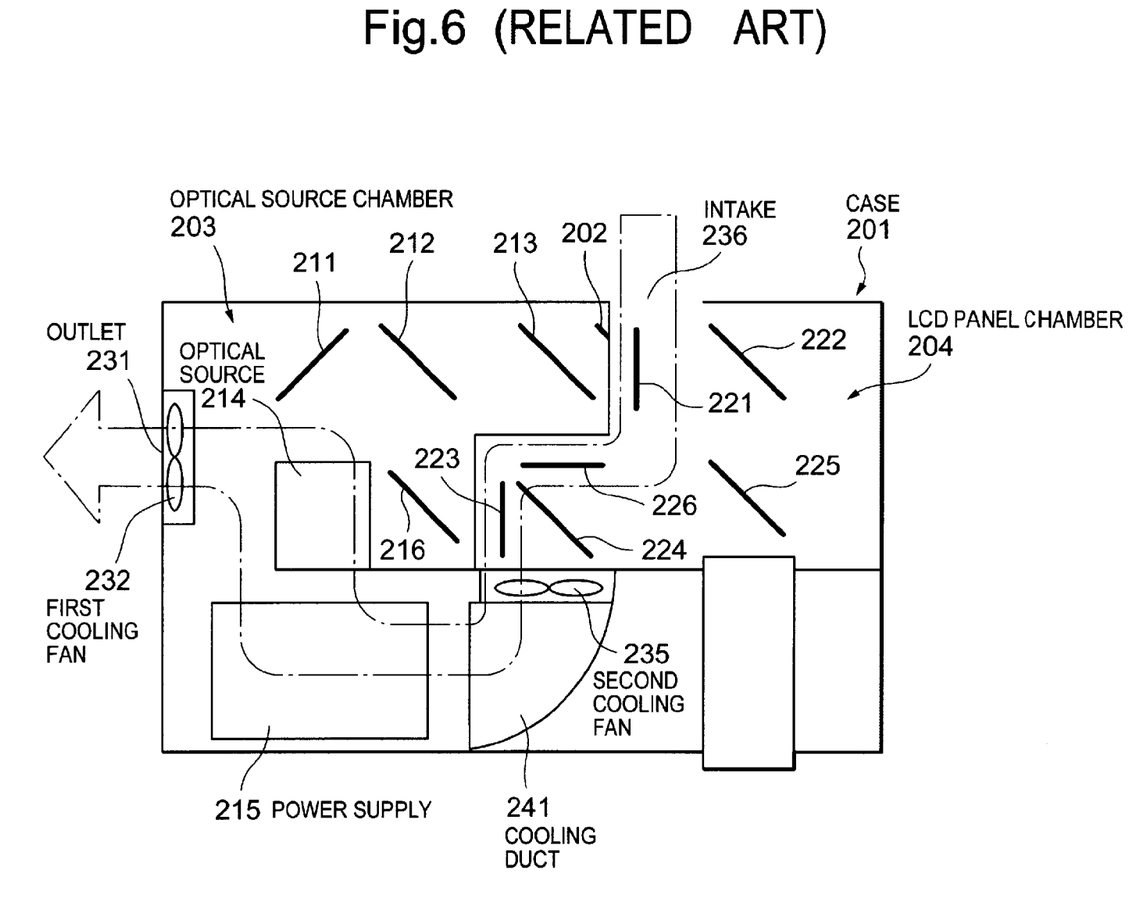
FIG. 6 is a perspective plan view showing a cooling system for a video projector according to a second related art.

FIG. 6 is a perspective plan view showing a cooling system for the video projector according to the second related art. The video projector includes a plurality of cooling fans 232, 235. The first cooling fan 232 is incorporated in a case 201. The second cooling fan 235 is located between an optical source chamber 203 and a LCD panel chamber 204. A cooling duct 241 is provided on the exhaust side of the second cooling fan 235, for leading air fed from the second cooling fan 235, around a power supply 215 and an optical source 214 in the optical source chamber 203.

In this arrangement, air which has been sucked into the LCD panel chamber 204 by driving the second cooling fan 235, passes around optical components 211 to 226. Thereafter, the air is led from the second cooling fan 235 into the cooling duct 241. Then, this air is sucked into the optical source chamber 203 by driving the second cooling fan 235 so as to cool the power supply 215 and the optical source 214. Thereafter, the air is exhausted from an outlet 231.

Further, Japanese Laid-Open Patent Publication No. Hei 4-191726 (published on Jul. 10, 1992 in Japan) discloses a liquid crystal projector including a single cooling fan for cooling components to be cooled in the case of the projector. The technology will be described as a third related art.

Figure 7:
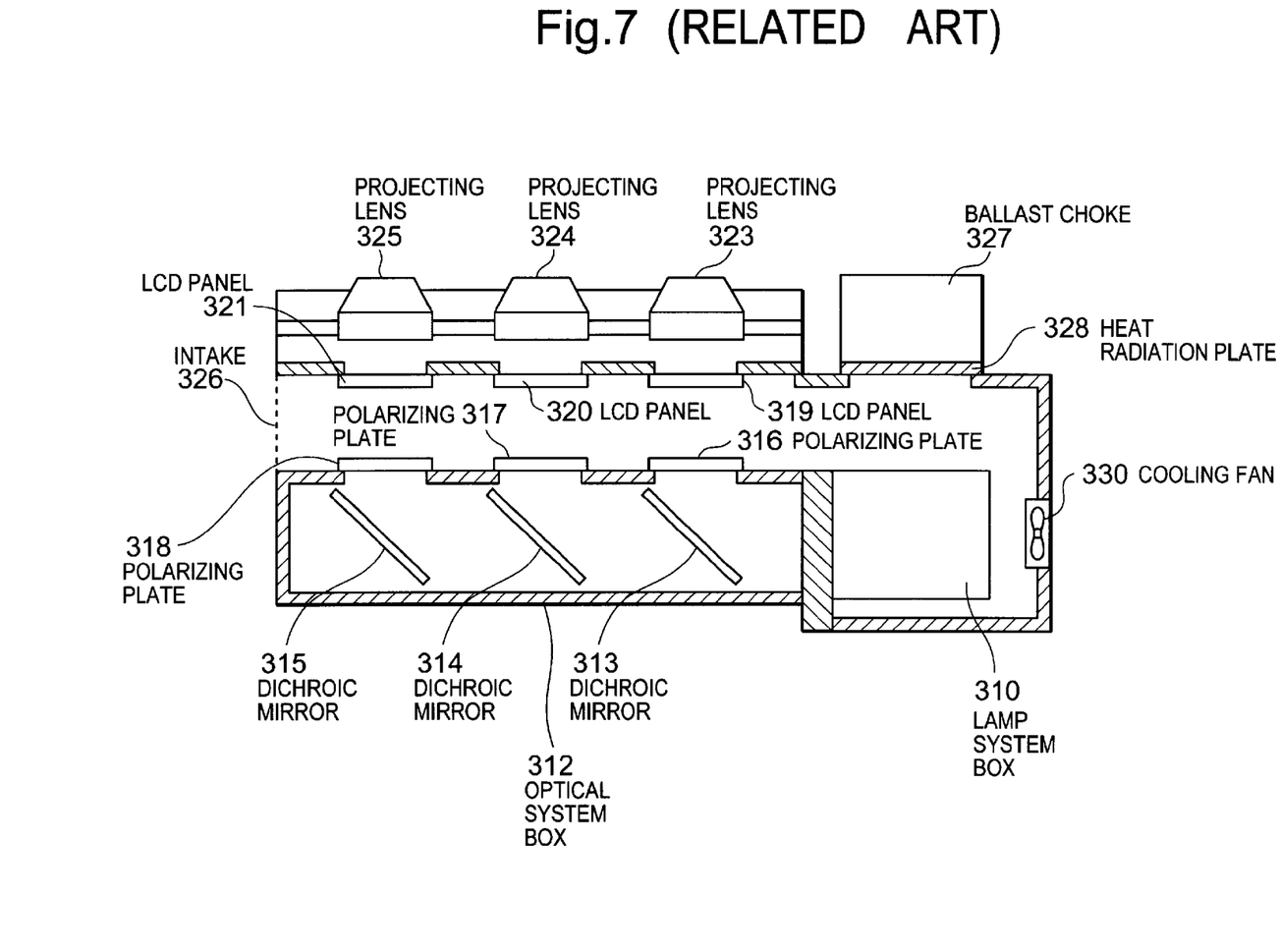
FIG. 7 is a perspective plan view showing a cooling system for a video projector according to a third related art.

FIG. 7 is a perspective plan view showing a cooling system for the video projector according to the third related art. The video projector is composed of a lamp system box 310, an optical system box 312, dichroic mirrors 313 to 315, polarizing plates 316 to 318, LCD panels 319 to 321, projecting lenses 323 to 325, an intake 326, a ballast choke 327, and a heat radiation plate 328 and a cooling fan 330. In this arrangement, an air stream is sucked through the intake 326, passing by way of the polarizing plates 316 to 318, the LCD panels 319 to 321, the heat radiation plate 328 and the lamp system box 310, successively. Then, the air stream is sucked into the cooling fan 330 so as to be discharged outside of a case.

However, the cooling system for the video projector in the first related art suffers from the following disadvantages inherent thereto.

As to the first disadvantage, the outlet axial fan 119 is provided with an opposite side 118b, which is on the side remote from the projecting lens 120, on the case 118. That is, on an operator's side or a viewer's side. Accordingly, the operator or the viewer is exposed to hot exhaust air so as to feel discomfort.

This is because the outlet axial fan 119 has to be located in proximity with the projecting lamp 104 since the projecting lamp 104 which exhibits a highest temperature should be effectively cooled. An optical system composed of several optical components 105 to 109 and having a large occupying area is present between the projecting lamp 104 and the projecting lens 120. Accordingly, the projecting lamp 104 has to be located on the opposite side 118b remote from the projecting lens 120, that is on the side where the operator or the viewer is existing. Thus, hot air is inevitably discharged to the side where the operator or the viewer is present.

Even though the outlet axial fan 119 is provided with the opposite side 118b of the case 118 to a lens side 118a so as to discharge the hot air to the opposite side 118b of the case 118, the passage of the cooling air stream S in the case 118 would become extremely long so as to increase ventilation resistance. This causes that the cooling efficiency would becomes greatly low since the axial flow fan has a structure having a low static pressure. Thus, this arrangement is not useful.

Further, even though the projecting lamp 104 is located on the lens side 118a in the case 118, the position of the optical system cannot be changed. Accordingly, the projecting lamp 104 has to be attached in a narrow space with an inclined posture. However, the inclined posture of the projecting lamp 104 causes the temperature distributions inside and around the projecting lamp 104 to be not uniform. Accordingly, a locally high temperature part is produced so that a filament in the projecting lamp 104 is possibly broken, thereby the use life of the projecting lamp 104 becomes shorter. Thus, this arrangement is also not useful.

As to the second disadvantage, a projected image is not uniform.

The reason is that an axial fan whose discharging direction is along the rotary shaft thereof is used as the intake axial fan 123. This causes that the cooling air stream S flows, being inclined in a diagonal direction of surfaces of the LCD panels 106 while the inclination of the cooling air stream S depends upon a rotating direction of the intake axial fan 123. Accordingly, the flowing velocity of the cooling air stream S is not uniform over the entire surface of the LCD panels 106. Thus, the temperature distribution over the entire surface of the LCD panels 106 is locally not uniform. Further, since the cooling air stream S is forced to flow through a narrow gap between the LCD panels 106 and the cross dichroic prism 110, the cooling air stream S likely to be disturbed by components for supporting the LCD panels 106 and the like. Accordingly, the cooling air stream S can hardly flow in part. Such non-uniform temperature distribution causes the optical characteristic of the liquid crystal to become locally different over the LCD panels 106. As a result, the projected image becomes non-uniform.

As to the third disadvantage, the air filter 111 has to be provided with the bottom surface of the case 118. Accordingly, there is a problem such that dust is likely to be sucked into the case 118.

It is because of such a structure that the cooling stream S from the intake axial fan 123 is blown onto the bottom surface side of the LCD panels 106. In this structure, the intake axial fan 123 has to be provided directly below the LCD panels 106. Accordingly, it is likely to suck up dust or the like from the installation surface of the projector.

Further, if paper, carpet or the like laid on the installation surface is sucked to the air filter 111 so that the air filter is blocked up, the interior of the case 118 would be heated up to a temperature above an allowable limit. Accordingly, there is a risk of damaging components to be cooled.

Further, since the air filter 111 is provided with the bottom surface of the case 118, there is a problem such that it is difficult to replace the air filter 111 with a new one during the installation of the case 118 on a floor.

The above-mentioned problems have not yet been radically solved even by the second and third related arts.

SUMMARY OF THE INVENTION

An object of the present invention is to provide a cooling system for a video projector, which has a high degree of cooling efficiency and which can prevent the operator from being exposed to hot exhaust air.

Another object of the present invention is to provide a cooling system for a video projector, which enables an air filter to be easily replaced with another one.

To realize above-mentioned objects, the present invention provides a cooling system having a case; an intake formed on the case; an outlet formed on the case; a radial fan having an intake side and an exhaust side communicated with the outlet, for blowing air in a direction orthogonal to a rotary shaft thereof; and a cooling duct having an opening opened to a component to be cooled therearound located in the case, and another opening communicated with the intake side of the radial fan.

Due to the provision of this arrangement according to the present invention, negative pressure is induced in the case by means of the radial fan capable of producing a high static pressure so as to take a cooling air stream from the outside into the case. Accordingly, this cooling air stream is directly introduced, through a component therearound, into the radial fan for venting the air stream outside of the case. Thus, it is not required to force the cooling air stream to flow into narrow gaps among the components to be cooled, for ventilation. Further, it is possible to concentrically and efficiently blow cooling air onto required components to be cooled. Thus, the cooling air stream can smoothly flow, irrespective of the arrangement of the components to be cooled. Moreover, the distribution of flow velocity of the air stream can become uniform over the entire surface of display element while an atmospheric air can be smoothly taken into the case even though the air filter and the outlet are arbitrarily arranged.

DETAILED DESCRIPTION OF THE PREFERRED EMBODIMENTS (First Embodiment)

Figure 1:
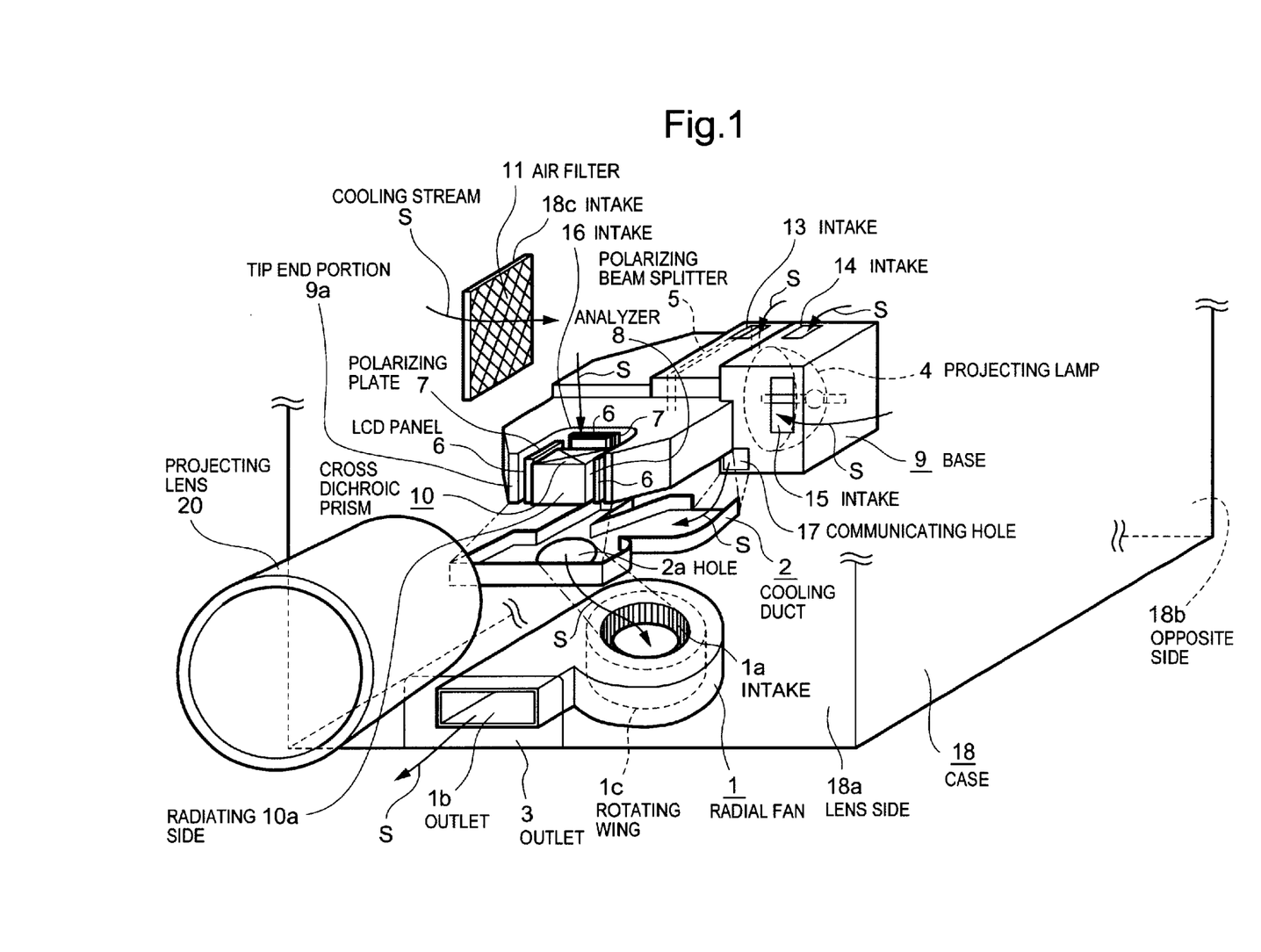
FIG. 1 is a partial-broken perspective view showing a cooling system for a video projector according to a first embodiment of the present invention.

FIG. 1 is a partial-broken perspective view showing a cooling system for a video projector according to a first embodiment. The video projector has a radial fan 1, a cooling duct 2, an outlet 3, a projecting lamp 4, a polarizing beam splitter 5, LCD panels 6, polarizing plates 7, analyzers 8, a base 9, a cross dichroic prism 10, an air filter 11, intakes 13 to 16, a communicating hole 17, a case 18, and a projecting lens 20.

The radial fan 1 is composed of a motor and an rotating wing 1c coupled to the rotary shaft of the motor, for blowing air in a direction orthogonal to the rotary shaft. The radial fan 1 is fixed to the bottom surface of the cooling duct 2. The radial fan 1 has an intake 1a communicated with a hole 2a formed piercing through the cooling duct 2, and an outlet 1b communicated with the outlet 3.

The cooling duct 2 is a guide member for a cooling air stream S. The cooling duct 2 has a concave-shaped cross-sectional area communicating with the intake 1a of the radial fan 1, the intake 16 and the communicating hole 17 each other. The cooling duct 2 is attached to the bottom surface of the base 9. The cooling duct 2 is formed on its center bottom surface with a hole 2a which pierces therethrough and communicated with the intake 1a of the radial fan 1.

The outlet 3 is an opening formed on a lens side 18a of the case, for discharging hot air from the inside to the outside of the case 18.

The projecting lamp 4 is a high intensity light source such as a halogen lamp for emitting white light. The projecting lamp 4 is incorporated in the base 9.

The polarizing beam splitter 5 is an optical element for transmitting therethrough selected wavelength light components of the white light emitted from the projecting lamp 4. The polarizing beam splitter 5 is incorporated in the base 9, adjacent to the projecting lamp 4.

The LCD panels 6 are optical elements for modulating the intensity of transmitting light in accordance with image signals of primary colors respectively provided therewith. The LCD panels 6 are arranged on a tip end potion 9a of the base 9, adjacent to side surfaces of the cross dichroic prism 10 respectively, so as to respectively modulate the intensity of light being passed through the polarizing beam splitter 5 in a pixel unit thereof.

The polarizing plates 7 are optical element for polarizing light incident upon the LCD panels 6. The polarizing plates 7 are respectively arranged adjacent to the LCD panels 6.

The analyzers 8 are optical elements for passing therethrough only polarized light in specified directions, in the light transmitted through the LCD panels 6. The analyzers 8 are respectively arranged adjacent to the LCD panels 6.

The base 9 is a hollow box extending from the position of the projecting lamp 4 to the positions of the LCD panels 6. The base 9 incorporates therein optical components for guiding light projected from the projecting lamp 4 into the LCD panels 6. The base 9 fixes components to be cooled, including the projecting lamp 4, to the interior of the case 18.

This base 9 incorporates therein the polarizing beam splitter 5 for splitting the white light from the projecting lamp 4 into light beams having the primary colors and reflecting mirrors (not shown), for guiding the split light beams of the primary colors to the LCD panels 6.

The cross dichroic prism 10 is a light synthesizing element for synthesizing a plurality of light beams incident thereupon and emitting as a synthesized light beam from a radiating side 10a. The cross dichroic prism 10 is supported to the tip end potion 9a of the base 9, being surrounded therearound by the LCD panels 6.

The air filter 11 is made of an unwoven fabric or the like. The air filter 11 is fitted to an intake 18c formed on a left side of the case 18 in FIG. 1, for filtering air from the outside of the case 18 before the air is introduced into the case 18.

The intakes 13 to 15 are holes for guiding the cooling air stream S in the case 18 to the outer surfaces of the polarizing beam splitter 5 and the projecting lamp 4. The intakes 13 to 15 are formed on the base 9, adjacent to the polarizing beam splitter 5 and the projecting lamp 4 as components to be cooled.

The intake 16 is directed to a gap between the LCD panels 6 and the cross dichroic prism 10 which are the components to be cooled, so as to suck the cooling air stream S in the case 18 between the LCD panel 6 and the cross dichroic prism 10. The intake 16 passes the cooling air stream S therethrough around the outer surfaces of the LCD panels 6 and the cross dichroic prism 10 so as to lead the cooling air stream S into the cooling duct 2 provided at the bottom surfaces of the LCD panels 6 and the cross dichroic prism 10.

The communicating hole 17 is an opening formed on the base 9, for leading the cooling air stream S into the cooling duct 2.

The case 18 is a case for the video projector. The case 18 incorporates all the components from the radial fan 1 to the communicating hole 17.

The projecting lens 20 is an optical lens or a lens array for enlarging the synthesized light beam emitted from the radiating side 10a of the cross dichroic prism 10 and then projecting the synthesized light beam onto a projection screen (not shown). The projecting lens 20 is attached to a lens side 18a of the case 18 on the side of the projection screen.

FIG. 1 is an exploded view showing the components, and the components connected together by the two-dot chain lines in FIG. 1 have to be actually connected together. The other figures are the same as FIG. 1.

Figure 2:
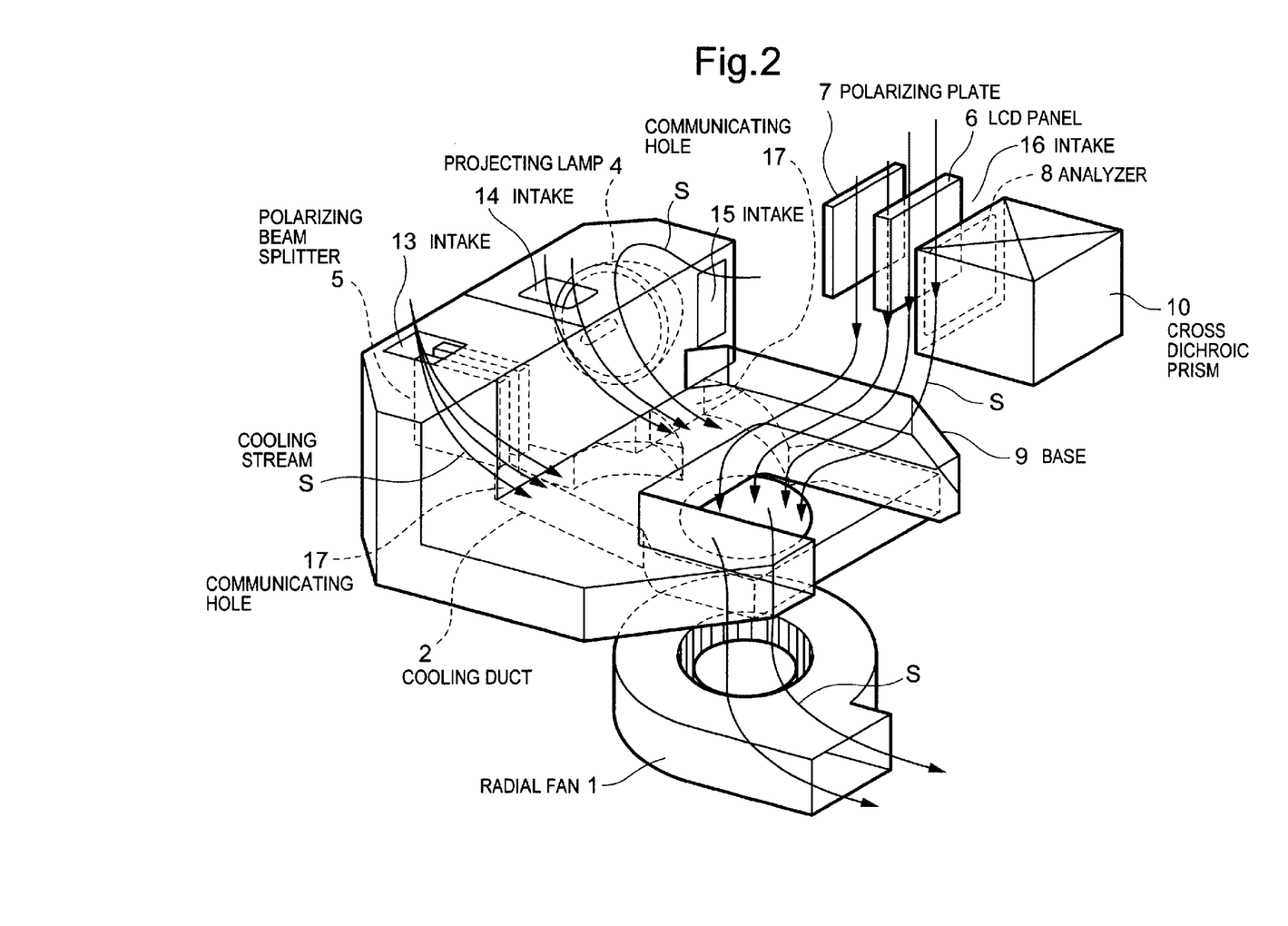
FIG. 2 is a conceptual perspective view explaining the flow passage of a cooling air stream according to the FIG. 1 embodiment.

FIG. 2 is a conceptual perspective view explaining the flow passage of the cooling air stream S according to the FIG. 1 embodiment. In FIG. 2, the components are conceptually shown in order to explicitly explain the passage of the cooling air stream S. When the radial fan 1 is rotated, the air pressure in the case 18 (in FIG. 1) is lowered. Accordingly, the cooling air S is taken into the case 18 through the air filter 11 (in FIG. 1) communicated with the outside of the case 18.

The cooling air stream S, after being taken into the case 18, are led into the base 9 through the intakes 13 to 16 which are arranged, adjacent to the polarizing beam splitter 5, the projecting lamp 4, the LCD panels 6, the cross dichroic prism 10. These intakes 13 to 16 are provided around components to be cooled so as to allow the cooling air stream S pass along the outer surfaces of the components to be cooled. Accordingly, the components to be cooled are cooled through the heat-exchange between them and the cooling air stream S.

The air stream S led into the base 9 then passes through the cooling duct 2. The cooling air stream S is taken into the radial fan 1 so that the cooling air stream S is discharged to the outside of the case 18 through the outlet 3 (FIG. 1) located adjacent to the radial fan 1.

In this embodiment, using the radial fan is a typical point. In comparison with the radial fan with the axial fan as described in FIG. 5, the blowing amount of the axial fan is greater than that of the radial fan, but the static pressure (the blowing pressure) of the radial fan is higher than that of the axial fan.

As mentioned above, in this embodiment, the radial fan is typically used for inducing a negative pressure in the case. The cooling stream is efficiently and concentrically directed to the components to be cooled by means of the cooling duct opened in the vicinity of the components to be cooled. Accordingly, the components to be cooled can be efficiently cooled while the intakes, the air filter and the outlet may be located at arbitrary positions in the case.

Further, since the cooling fan is not located in the vicinity of the projecting lamp, ultraviolet radiation contained in the light emitted from the projecting lamp, which is harmful to a human body, can be prevented from leaking from the case through gaps among blades of the cooling fan. Accordingly, it is possible to eliminate the necessity of provision of a cover plate for preventing the leakage of the ultraviolet radiation.

(Second Embodiment)

Figure 3:
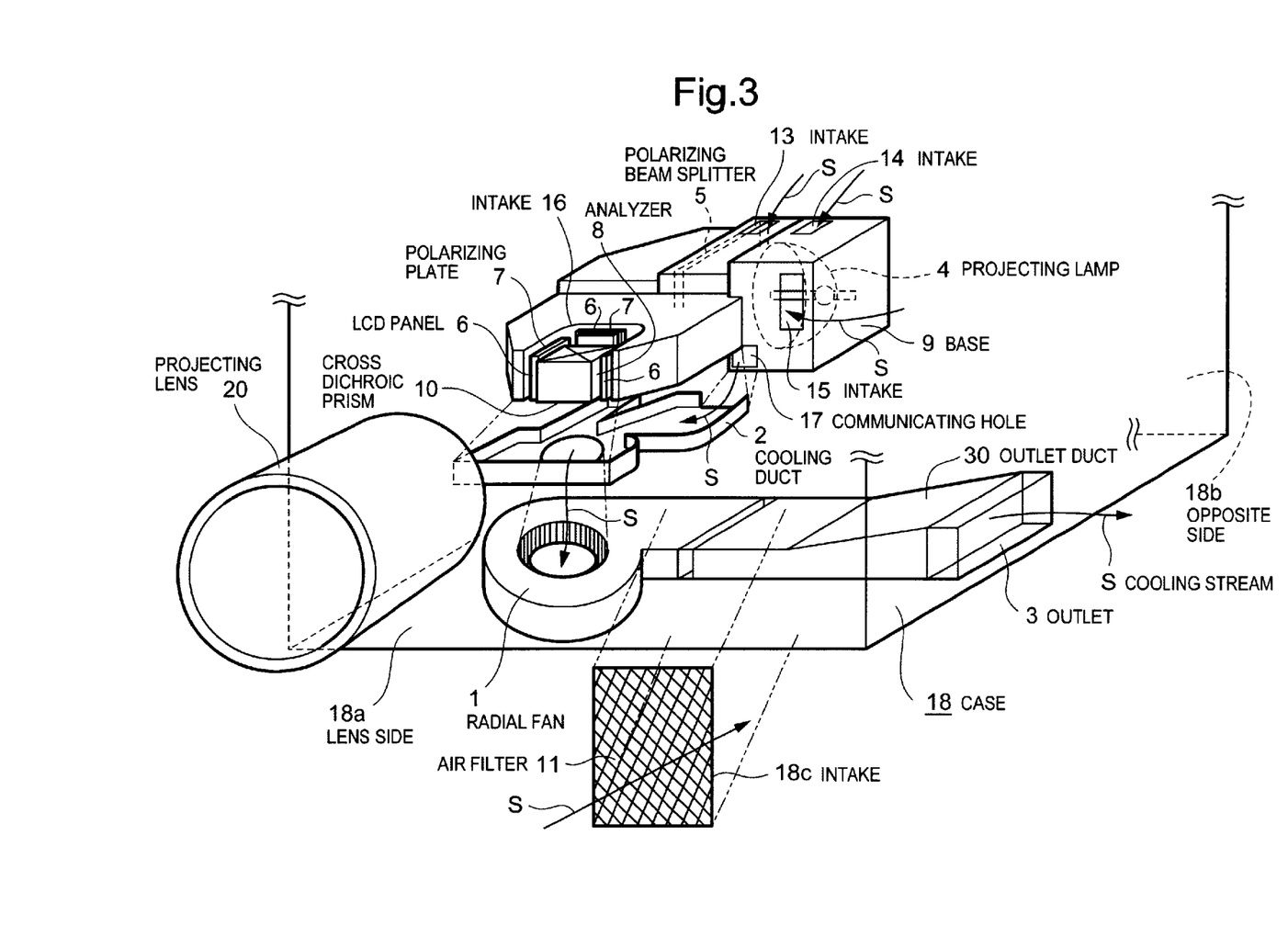
FIG. 3 is a partial-broken perspective view showing a cooling system for a video projector according to a second embodiment of the present invention.

FIG. 3 is a partial-broken perspective view showing a cooling system for a video projector according to a second embodiment of the present invention. The arrangement is similar to that of the first embodiment shown in FIG. 1, except that the position of the outlet 3 is shifted to the right side of the case 18 while an intake 18c and the air filter 11 are shifted to the lens side 18a of the case 18 in FIG. 1. In this embodiment, since the radial fan 1 and the outlet 3 are distant from each other, they communicate with each other by an outlet duct 30.

In this embodiment, the attaching direction of the radial fan and the position of the outlet on the case can be changed. That is, the direction of the discharged air may be arbitrarily changed. Further, the attaching positions of the intakes and the air filter may also be changed to arbitrary positions on the case.

(Third Embodiment)

Figure 4:
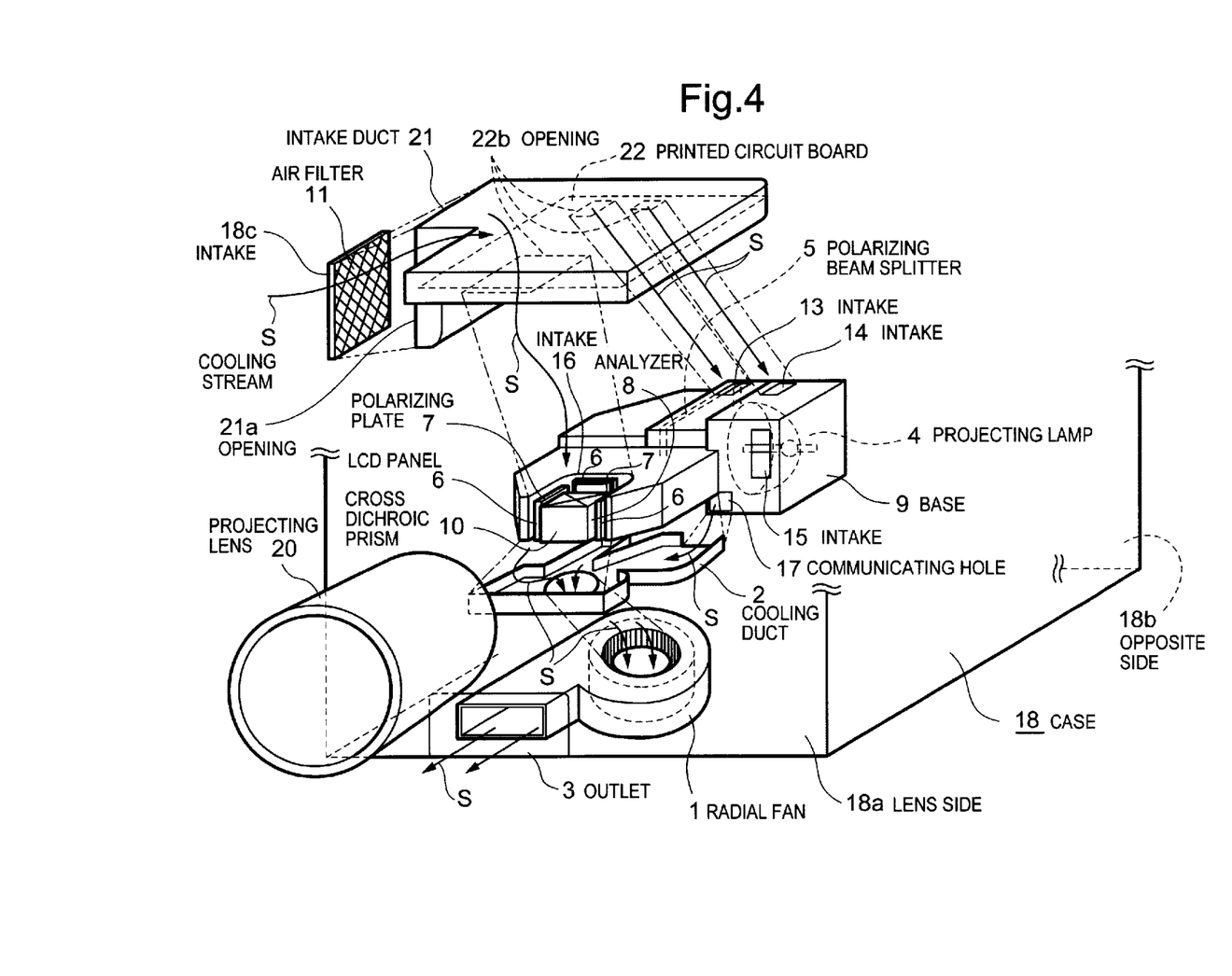
FIG. 4 is a partial-broken perspective view showing a cooling system for a video projector according to a third embodiment of the present invention.

FIG. 4 is a partial-broken perspective view showing a cooling system for a video projector according to a third embodiment of the present invention. This embodiment is the same as that of the first embodiment shown in FIG. 1, except that an intake duct 21 and a printed circuit board 22 are added thereto. The intake duct 21 has an opening 21a communicated with the air filter 11, and other openings 22b communicated with the intakes 13 to 16, respectively. That is, a plurality of hollow passages are defined in the intake duct 21 so that the cooling air stream S is efficiently led from the air filter 11 to the components to be cooled, direct thereto.

Further, as shown in FIG. 4, by locating the printed circuit board 22 in the intake duct 21, the cooling air stream S at first cools the printed circuit board 22, then is sucked into the base 9 through the intakes 13 to 16 so as to cool the components to be cooled attached to the base Thus, in this embodiment, the intake duct for leading the cooling air stream from the components to be cooled therearound to the intake of the radial fan is provided, the cooling air stream can be directed only to the components which require cooling and can be efficiently applied to them.

Further, in such a case that the components to be cooled are accommodated in the cooling duct, the components can be directly cooled.

It is noted that the cooling duct 2 and the base 9 are formed, separate from each other in the above-mentioned embodiments, but they may be integrally incorporated with each other. In the latter case, the cooling duct 2 and the base 9 are considered as an integral cooling duct as a whole. Further, a part of the cooling duct 2 may be used as the base 9 within the scope of the present invention.

With the use of the above-mentioned arrangement according to the present invention, the following advantages can be obtained.

As to a first advantage, the intakes, the air filter and outlet can be located at arbitrary positions in the case. Accordingly, it is possible to expect a high degree of cooling efficiency because the radial fan capable of producing high static pressure is used so as to induce a negative pressure in the case and concentrically direct the cooling air stream to the components to be cooled. Thus, the cooling air stream can be prevented from being affected by the positions of the components to be cooled. Accordingly, the cooling air stream can be smoothly created.

As to a second advantage, the degree of quality of a projected image can be enhanced because the radial fan capable of generating high static pressure is used so as to induce the negative pressure in the case so that it is not necessary to force the cooling air stream to flow into the narrow gaps among the components. Accordingly, the draft resistance of the cooling air stream can be lowered. Thus, the entire surface of the display elements can be cooled uniformly thereover. Accordingly, the optical characteristic of liquid crystal can be maintained to be uniform over the entire surface of the display elements, thereby the projected image can become uniform.

As to a third advantage, it is excellent in the replacement of the air filter with another one because the radial fan capable of producing high static pressure is used as the cooling fan with the radial fan being arranged facing the outlet so as to induce the negative pressure in the case so that the cooling air stream uniformly flows in the case without being affected by the shapes and the locations of the components to be cooled. Thus, the air filter can be located at an arbitrary position in the case.

As to a forth advantage, the components to be cooled can hardly be damaged by overheating because the air filter can be located on the case, other than on the bottom surface of the case so that no dust or paper on the bottom surface of the case is prevented from being sucked up by the air filter. Thus, it is possible to prevent the components to be cooled in the case from being overheated.

What is claimed is:

1. A cooling system for a video projector, comprising
   a case;
   an intake formed on said case;
   an outlet formed on said case;
   a radial fan having an intake side and an exhaust side communicated with said outlet, for blowing air in a direction orthogonal to a rotary shaft thereof; and
   a cooling duct having an opening opened to a component to be cooled therearound located in said case, and another opening communicated with said intake side of said radial fan.

2. The cooling system for a video projector as defined in claim 1, further comprising a base located in said case and on which said component to be cooled is attached, wherein said base constitutes a part of said cooling duct.

3. The cooling system for a video projector as defined in claim 1, wherein said component to be cooled is fixed to said cooling duct.

4. The cooling system for a video projector as defined in claim 1, further comprising an air filter attached to said intake.

5. The cooling system for a video projector as defined in claim 1, wherein said component to be cooled is accommodated in said cooling duct.

6. The cooling system for a video projector as defined in claim 1, wherein said intake is provided at a position other than on a bottom surface of said case.

7. The cooling system for a video projector as defined in claim 1, wherein said outlet is provided on a surface of said case which includes a projecting lens.

8. The cooling system for a video projector as defined in claim 1, wherein said outlet is provided on a surface of said case other than a surface which includes a projecting lens.

9. The cooling system for a video projector as defined in claim 1, wherein said component to be cooled is a projecting lamp.

10. The cooling system for a video projector as defined in claim 1, wherein said component to be cooled is a beam splitter.

11. The cooling system for a video projector as defined in claim 1, wherein said component to be cooled is a liquid crystal display panel.

12. The cooling system for a video projector as defined in claim 1, wherein said component to be cooled is a dichroic prism.

13. The cooling system for a video projector as defined in claim 1, wherein said component to be cooled is an analyzer.

14. The cooling system for a video projector as defined in claim 1, wherein said component to be cooled is a polarizing plate.

15. A cooling system for a video projector, comprising:
   a case provided with an intake and an outlet;
   a plurality of components disposed within said case so as to be cooled by air stream flowing from said intake to said outlet;
   a cooling duct having openings opened to said components to introduce said air stream passed through said components into said openings; and a radial fan having an intake portion and an exhaust portion communicated with said outlet, said intake portion being communicated with said cooling duct such that said air stream is uniformly introduced into said openings.

16. The cooling system for a video projector as defined in claim 15, wherein said components includes a projecting lamp, a beam splitter and a liquid crystal display panel.

17. The cooling system for a video projector as defined in claim 15, wherein said cooling duct has a concave-shaped cross-sectional area communicating with said components and said intake portion of said radial fan.

18. The cooling system for a video projector as defined in claim 15, further comprising a base located in said case and on which said components are attached so as to constitute a part of said cooling duct.

19. The cooling system for a video projector as defined in claim 18, further comprising an intake duct connected between said intake of said case and said components.

20. The cooling system for a video projector as defined in claim 19, further comprising a printed circuit board disposed within said intake duct.

* * * * *